(12) United States Patent
Kim

(10) Patent No.: US 6,544,483 B1
(45) Date of Patent: Apr. 8, 2003

(54) ADSORBENT GAS SCRUBBER TO DISPOSE THE GAS GENERATED DURING THE SEMICONDUCTOR MANUFACTURING PROCESS

(75) Inventor: Dong-Soo Kim, Inchon (KR)

(73) Assignee: Korea M.A.T. Co., Ltd. (KR)

( * ) Notice: Subject to any disclaimer, the term of this patent is extended or adjusted under 35 U.S.C. 154(b) by 0 days.

(21) Appl. No.: 09/276,229

(22) Filed: Mar. 25, 1999

(51) Int. Cl.[7] .................. B01D 53/04; B01D 53/34; B01D 53/82; B01D 53/88
(52) U.S. Cl. .................. 422/177; 422/113; 422/168; 422/171; 96/113; 96/116
(58) Field of Search ............... 422/168–172, 422/177, 112–113; 96/116, 113

(56) References Cited

U.S. PATENT DOCUMENTS

| | | | | |
|---|---|---|---|---|
| 4,321,069 A | * | 3/1982 | Ritter | 96/116 |
| 4,668,369 A | * | 5/1987 | King | 204/227 |

FOREIGN PATENT DOCUMENTS

| | | | |
|---|---|---|---|
| GB | 2323312 | * | 9/1998 |
| JP | 52-15479 | * | 2/1977 |

* cited by examiner

*Primary Examiner*—Hien Tran
(74) *Attorney, Agent, or Firm*—Kevin L. Daffer; Conley, Rose & Tayon P.C.

(57) ABSTRACT

An adsorbent gas scrubber is provided in which the processing efficiency of the gas generated during semiconductor manufacturing can be increased, as the idle time of the system is reduced. The above mentioned object and other objects are accomplished by an adsorbent gas scrubber in accordance with aspects of the present invention which comprise an induction tube being connected to a gas inlet attached with a first pressure gauge for measuring a pressure of the entered gas, and an adsorbent case placed adjacent to the induction tube. The adsorbent case contains a layered arrangement of multiple catalytic-adsorbent members which adsorb the gas that flows from the induction tube to a gas outlet attached with a second pressure gauge for measuring pressure of the processed gas being discharged. A series of gas passage tubes placed at the bottom portion of the induction tube and the adsorbent case supply gas to the catalytic-adsorbent members. A gas passage means controls the flow of gas that comes in from the induction tube such that the gas is either allowed to or blocked from flowing into each catalytic-adsorbent members placed in the adsorbent case, based on the pressure difference between the first pressure gauge and the second pressure gauge.

18 Claims, 4 Drawing Sheets

ADSORBENT GAS SCRUBBER TO DISPOSE THE GAS GENERATED DURING THE SEMICONDUCTOR MANUFACTURING PROCESS

BACKGROUND OF THE INVENTION

1. Field of the Invention

This invention relates to a gas scrubber which can dispose of harmful gases used in or generated by a semiconductor manufacturing process. More particularly, the gas scrubber is an adsorbent gas scrubber which treats gas by letting the gas pass through an adsorbent case having catalytic-adsorbent particles contained within multiple layers of catalytic-adsorbent members.

2. Description of the Related Art

Generally, when manufacturing a semiconductor product, gases having harmful, flammable and corrosive properties are used. For example, in the process of forming a semiconductor, Chemical Vapor Deposition (CVD), Low Pressure CVD, Plasma CVD, Plasma Corrosion, and Epitaxy CVD processes may be used which employ gas materials such as $SiH_4$, $SiH_2Cl_2$, $4NH_3$, $NO$, $AsH_3$, $PH_3$, $B_2H_6$, $BCl_3$.

The gas produced during the process of the semiconductor manufacturing contains harmful materials, such as $SiH_4$, $SiH_2Cl_2$, $4NH_3$, $AsH_3$, $PH_3$, $B_2H_6$, $BCl_3$, $WF_6$, $PBr_3$, $(C_2H_5O)_4Si$, $(C_4H_9)_3Al$, and the organic materials accumulated in a high density form. In order to prevent or minimize environmental contamination or pollution through leakage of the gas materials into the atmosphere, regulations for the application of the law are strictly enforced to purify the exhaust gas before the gas is exhausted into the atmosphere.

There are typically three methods used to dispose the toxic gases used or produced during, for example, semiconductor manufacturing. First, flammable toxic components contained in the exhaust gas may be burned at high temperature of 500° C. or 800° C. within a burning chamber. Second, water-soluble toxic components contained in the exhaust gas may be dissolved by wetting the water-soluble toxic components as they pass through water stored in a bath. Third, certain toxic components which cannot be burned or melted, may be adsorbed whereby toxic components are decomposed physically and chemically gas they pass through the adsorbents.

When the above burning method is used for disposing the toxic components contained in the exhaust gas, $SiH_4$, one of the toxic components contained in the generated gas, may be burned with oxygen in air resulting in creation of silicon dioxide. Unfortunately, the silicon dioxide causes several problems. First, the silicon dioxide particles may form as a result of a gas phase reaction which could clog gas passages in the burner, and in some instances cause mechanical problems in the burning system. Second, the silicon dioxide is generally collected through a washing process and water used in the washing process must be treated to completely remove any of remaining chemical particles or other contaminated materials before disposal.

The wetting method consists of two processes, one being a wet chemical solution which is used to dispose the toxic components of the exhaust gas that are water-soluble, and the other being a dry chemical solution which is used to dispose non-water soluble material by dissolving them chemically. However, even though the above wetting method is effective in treating the gas produced during the semiconductor manufacturing process, it is generally less preferred because the used water or chemical solution must be treated before being discharged from a factory in order to meet more toughened world-wide water pollution standards.

The gas adsorbent method is used to dispose the toxic components contained in the gas by creating the following examples of physical or chemical reactions while certain toxic components pass through the catalytic-adsorbent material:

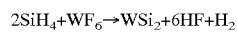

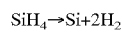

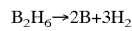

However, the above adsorbent method has a problem in that the adsorbent must be frequently replaced with new adsorbent because the adsorbent particles agglutinate with the toxic compounds and, over time, clog the gas flow passages therebetween. This will eventually lead to a decrease in a gas flow rate of the gas that passes through the adsorbent particles.

Accordingly, it would be of benefit to provide an adsorbent gas scrubber which can effectively dispose the harmful gas generated during the semiconductor manufacturing process and decrease the system idle time by providing a construction that allows for easy replacement of the adsorbent case and adsorbent particles within the case.

SUMMARY OF THE INVENTION

The problems outlined above are in large part solved by an adsorbent gas scrubber. The present gas scrubber may include a cabinet which houses an induction tube that functions similar to a manifold or valve for coupling gas from a gas intake to corresponding gas passage tubes. The gas inlet is preferably attached to and in gaseous communication with a first pressure gauge for measuring a pressure of gas entering the gas inlet (or gas intake valve). The cabinet further houses an adsorbent case placed adjacent to the induction tube. The adsorbent case may include multiple layers of catalytic-adsorbent members configured to adsorb the gas as the gas flows from the induction tube into the adsorbent case. Coupled to an output of the induction tube is a gas outlet. Attached to the outlet valve is a second pressure gauge for measuring pressure of the processed gas being discharged. A gas passage extends at the bottom portion of the induction tube and the adsorbent case for supplying the gas to a catalytic-adsorbent member located in the bottom of the adsorbent case. Gas flow from the induction tube to the adsorbent case is controlled among several layers of catalytic-adsorbent members to either allow gas flow or to block gas flow into each of several catalytic-adsorbent members stacked a spaced distance from each other in the adsorbent case. The gas flow is regulated based on the pressure difference between the first pressure gauge and the second pressure gauge.

According to another embodiment, the adsorbent gas scrubber further includes a pipe tube which connects the gas intake and the gas outlet. A first open/shut valve is preferably located on the gas intake in the path between the gas intake and the gas outlet, and a second open/shut valve is preferably placed in the pipe tube.

According to yet another embodiment, the gas passage tube between the induction tube and the adsorbent case includes a multi-layer piston material that operates when the pressure difference between the intake gas pressure and the outlet gas pressure measured by the first and the second pressure gauge is larger than the threshold value. The multi-layer piston material preferably is several pistons, each of which control gas flow within a respective gas passage tube that extends between an opening within the induction tube and an opening within a catalytic adsorbent case. Similar to the catalytic adsorbent cases stacked within the adsorbent case, gas passage tubes deliver gas into respective cases and the gas flow therein is regulated by moving the associated piston. Thus, the pistons controls flow within the multi-layer tube material that extends between one side of the induction tube and one side of the adsorbent case, where a stacked arrangement of adsorbent cases reside.

Preferably, one end of each gas passage tube is connected to an opening of the induction tube, and a middle portion of the gas passage tube is connected to and opens onto an opening of the adsorbent case and, more particularly, to an opening of the adsorbent case. The piston reciprocates within the gas passage tube and resides from a location opposite the end connected to the induction tube when the induction tube becomes connected to the adsorbent case.

The above mentioned catalytic-adsorbent member is fixed onto an inner surface of the adsorbent case by a supporter. The supporter is placed between pairs of adsorbent cases stacked a spaced distance from each other within the cylindrically shaped adsorbent case having an opening at the top of the case. Each adsorbent case includes a tube opening that is connected to the middle part of a respective gas passage tube. The catalytic-adsorbent particles within each member is preferably carbon or $Al_2O_3$, or particles coated with the oxygen metals.

DETAILED DESCRIPTION OF THE INVENTION

Figure 1:
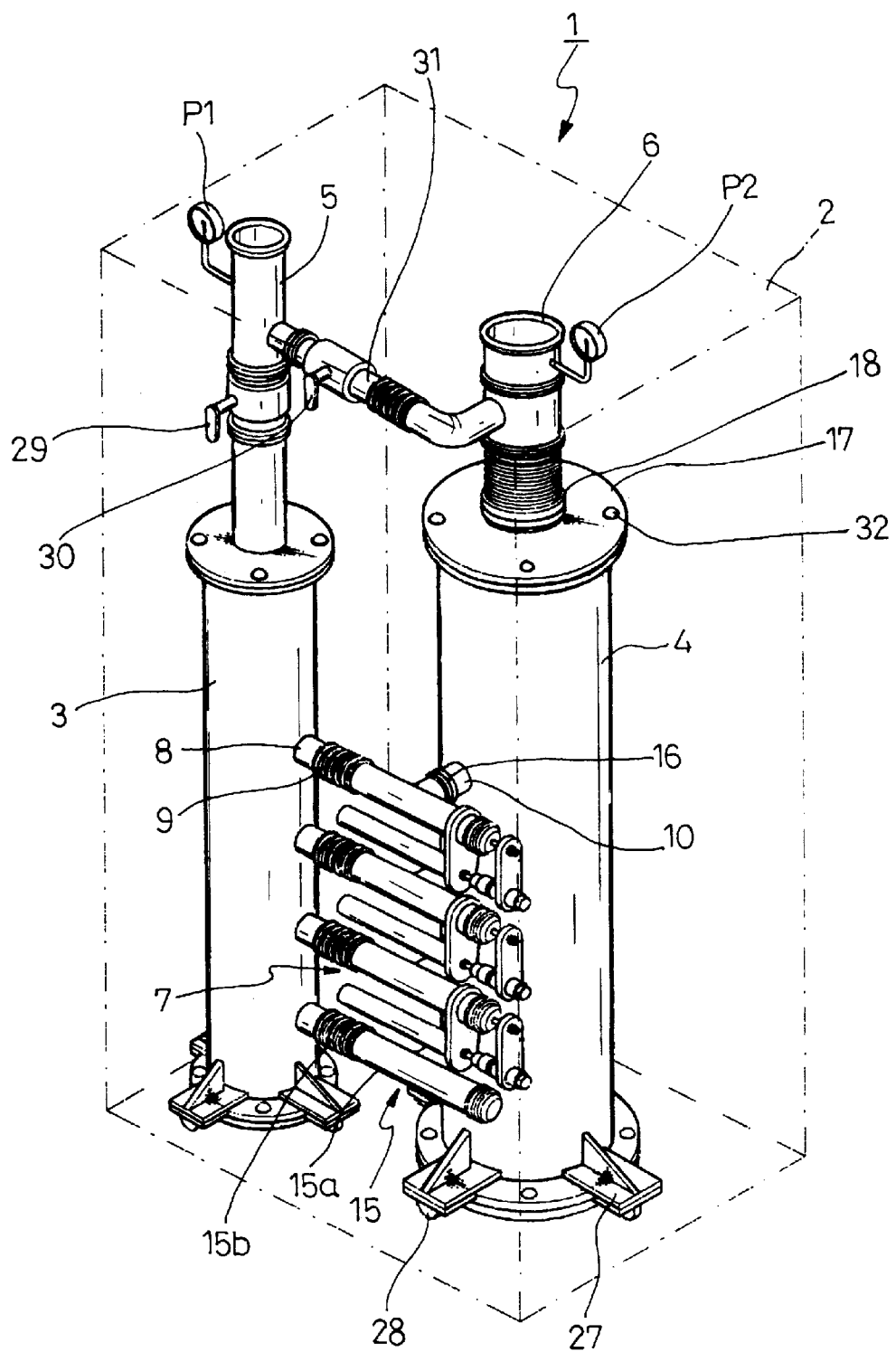
FIG. 1 is a perspective view of an adsorbent gas scrubber in accordance with one embodiment of the invention.

Referring now to the drawings wherein like reference characters designate corresponding parts throughout several views.

Figure 2:
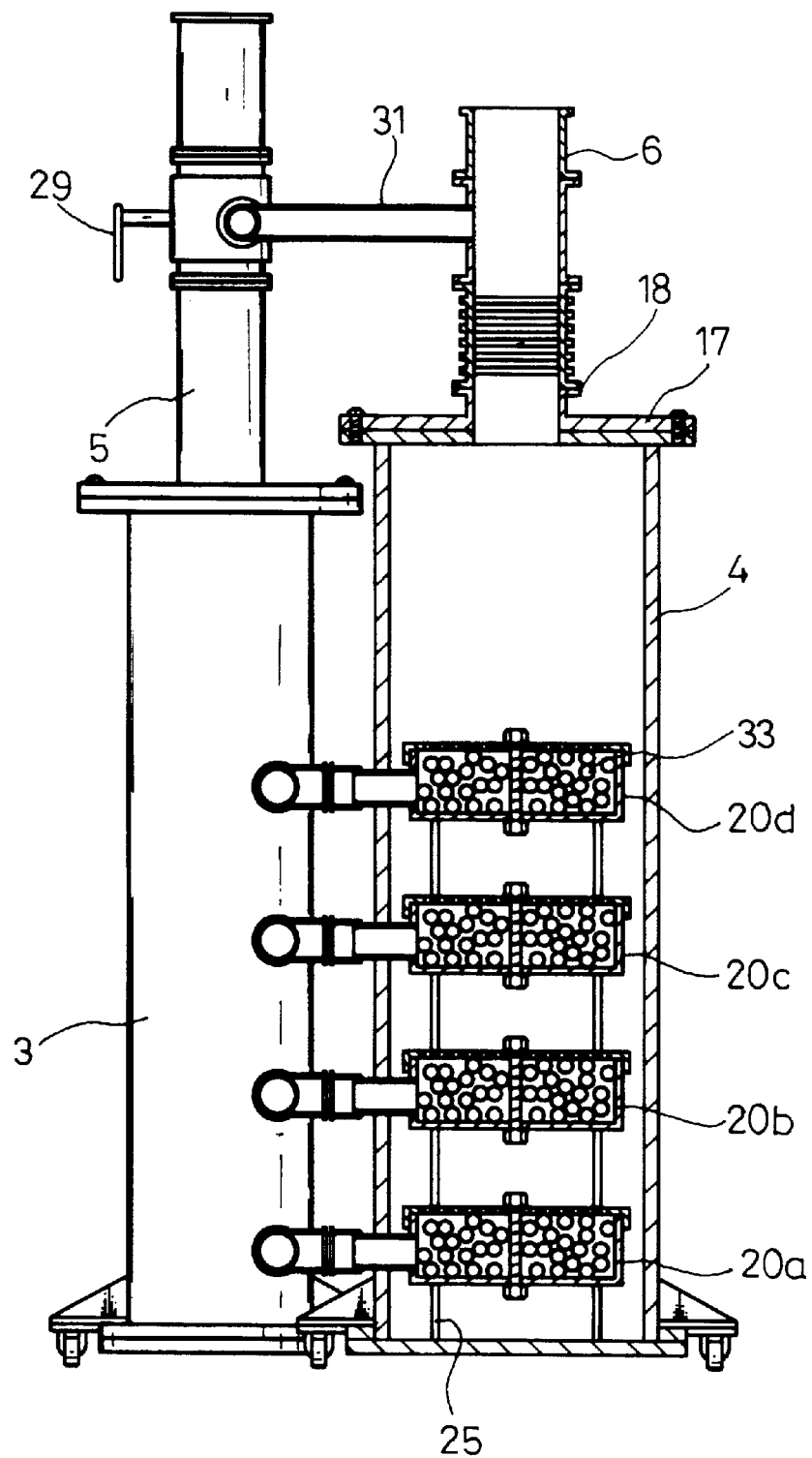
FIG. 2 is a sectional view of an adsorbent case of the adsorbent gas scrubber shown in FIG. 1.

FIG. 1 is a perspective view of an adsorbent gas scrubber in accordance with the present invention, and FIG. 2 is a sectional view of an adsorbent case of the adsorbent gas scrubber shown in FIG. 1.

As illustrated in FIG. 1 and FIG. 2, the adsorbent gas scrubber 1 includes a cabinet 2 that is preferably rectangular in shape. A door is hinged at one side of the cabinet 2 (not shown in the drawing) and can be closed and opened from outside. The gas generated during the semiconductor manufacturing process is led to flow into the induction tube 3 placed in the cabinet 2 from the gas intake 5 that runs through the upper portion of cabinet 2. The gas inducted from the gas intake 5 is monitored by the first pressure gauge P1 placed on the gas intake 5. The top of the induction tube 3 is connected with the gas intake 5 by way of the flange connection means, and the bottom of the induction tube 3, which is detachable, is mounted on at the bottom of the cabinet 2.

The cylinder-like adsorbent case 4 is placed near the induction tube 3, and the top of the adsorbent case 4 is tightly covered with a circular plate 17. The upper center portion of the circular plate 17 is formed with the protrusion tube 18 connected to the gas outlet 6. The bottom of the adsorbent case 4 is detachably fixed on to the bottom of the cabinet 2 by one or more bracket 27, and comprises wheels 28 for easy removal.

In the adsorbent case 4, one or more catalytic-adsorbent members 33 are spaced from each other in layered fashion for the purpose of adsorbing the gas generated from the induction tube 3. And the top of the adsorbent case 4 is detachably connected to the gas outlet 6 to let the adsorbed gas out of the gas scrubber 1. The second pressure gauge P2 is placed in the gas outlet 6 to measure the pressure of the adsorbed gas.

Also, as illustrated in FIG. 1, one side of the induction tube 3 and the adsorbent case 4 have the first tube joint 8 and the second tube joint 10, respectively. The side of the first tube joint 8 and the second tube joint 10 are formed with the flange 9, 16. In order to supply the gas to the catalytic-adsorbent members 33 located at or near the bottom of the adsorbent case 4, the first tube joint 8 located in the bottom of the induction tube 3 is detachably connected to the second tube joint 10 located on the bottom of the adsorbent case 4 via the gas passage mechanism 15 (known to include gas passage tubes 7, as well as a pressure regulation mechanism described below). The gas passage mechanism 15 is coupled to the bottom of the adsorbent case 4 by using a coupling mechanism such as a clamp.

As illustrated in the drawing, each of the gas passage tubes have a fixed tube element 15a and the flexible tube element 15b connected together by a flange. If the distance between the induction tube 3 and the adsorbent case 4 changes, flexibility of the flexible tube element 15b accommodates changes that occur in the connecting distance.

Referring to the drawing, a plurality of gas passage units or tubes 7 are supplied at the bottom of the induction tube and the adsorbent case 4 in order to connect the first tube joint 8 and the second tube joint 10. A gas passage means is supplied in order to allow or block the flow of the gas from the induction tube 3 to the catalytic-adsorbent 33 located in the second or higher layer of the multi-layered, plurality of tubes 7.

Figure 4:
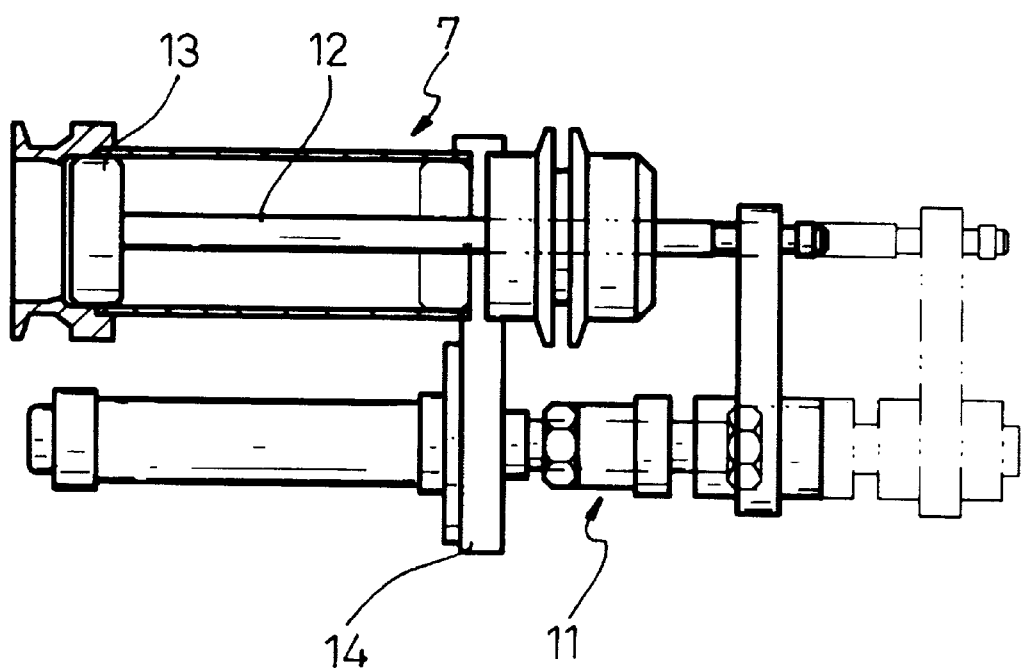
FIG. 4 is a sectional view of a valve piston to open and close the gas passage on the adsorbent gas scrubber in accordance with another embodiment of the invention.

As illustrated in FIG. 4, each of the plurality of gas passage tubes 7 include a multi-layer piston material 11 fixed to the outside surface of the adsorbent case 4. The multi-layer first tube joint is provided to the one side of the induction tube 3, and a multi-layer passage 12 extends through the multi-layer second tube joint 10 supplied with the adsorbent case 4 in order to connect with the layered catalytic-adsorbent 33 contained within respective, layered adsorbent cases 4. A valve material 13 is contained within each of the gas passage tubes 7. The valve material 13 operates as a piston which responds to operation of piston material 11. The piston material 11 operates when the difference between the induction gas pressure measured by the first pressure gauge P1 and the outlet gas pressure measured by the second pressure gauge P2 is greater than the threshold value.

The piston material 11 is connected to the passage 12 by the bracket means 14, and detachably connects the tube joint 8 of the induction tube 3 with the other tube material 10 formed on the outer surface of the adsorbent case 4. Since the structure of the passage 12 is same as that of the structure of the gas passage mechanism 15, the passage material 12 provides the flexibility in connecting distance between the induction tube 3 and the adsorbent case 4.

Figure 3:
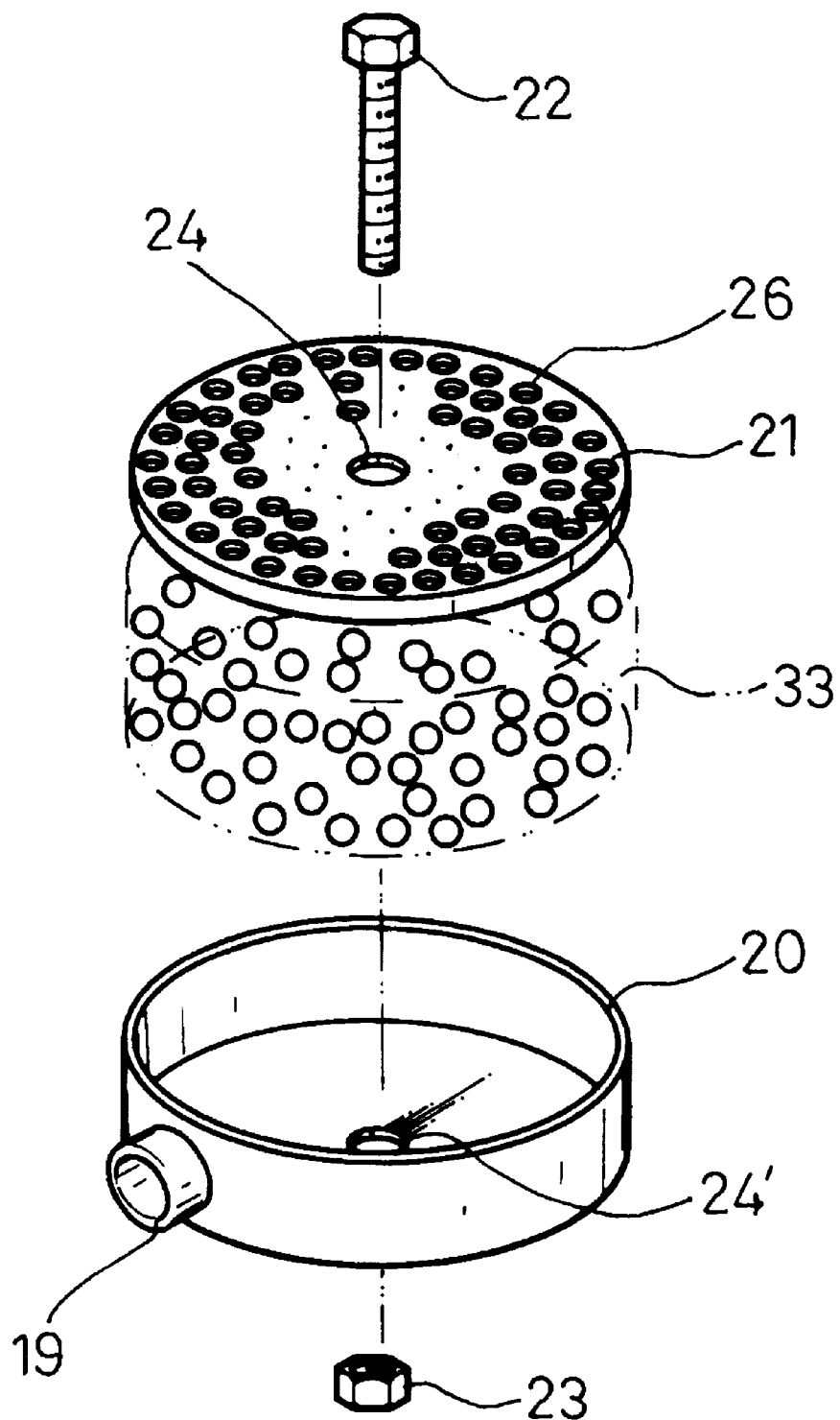
FIG. 3 is a side view of a catalytic-adsorbent case being located on the adsorbent case.

The catalytic-adsorbent member 33 comprises adsorbent particles such as carbon or $Al_2O_3$, or are particles coated with oxygen metals. Referring to FIG. 3, the catalytic-adsorbent 33 formed with the above mentioned particles is placed in the catalytic-adsorbent case 20 having a tube 19 that connects with the second tube joint 10. The catalytic-adsorbent case 20 is covered with a perforated cap 21. The center of cap 21 is formed with a hole 24 where a connection bolt 22 is used to secure cap 21 to case 20. A plurality of gas passage holes 26 extend through cap material 21 to let out the gas that has been treated with the catalytic-adsorbent 33. Also, in the catalytic-adsorbent case 20, the hole 24' in which the connection bolt 22 penetrates is formed in the bottom center of the catalytic-adsorbent case. When the catalytic-adsorbent particles 33 fill the catalytic-adsorbent case 20, the bolt 22 is inserted back into the hole 24 formed in the cap material 21 and the hole 24' of the catalytic-adsorbent case 20. When the bolt 22 is protruded through the hole formed at the bottom of the catalytic-adsorbent case 20, a nut 23 is threaded to fix the cap material 21 onto the catalytic-adsorbent case 20. Hence, the catalytic-adsorbent 33 is secured within the confines of the substantially planar cover of cap material 21 and the surrounding base and walls of the catalytic-adsorbent case 20.

As illustrated in FIG. 2, catalytic-adsorbent case 20 contains particles of catalytic-adsorbent material, and each case 20 is fixed in spaced relation to each other near the bottom of the cabinet 2 with supporters 25. Case 20a is spaced by supporter 25 from the bottom of case 4, wherein case 20b is spaced above case 20a by similarly configured supporters 25. Likewise, the other catalytic-adsorbent cases 20c and 20d are spaced above the catalytic-adsorbent case 20b by associated supporters 25. In order to prevent a movement of the supporter 25, on the surface of the cap 21 and the bottom surface of the catalytic-adsorbent case 20 are formed with a hole or a home in which the supporter 25 can be placed.

The gas intake 5 is connected with the gas outlet 6 through the connection tube 31 connected to the gas intake 5 with the connection means, such as the clamp. The connection tube 31 is connected to the gas outlet 6 with the connection means so that it could be detached when necessary. Since the first valve 29 is located in the gas intake 5 and the second valve 30 is located in the connection tube 31, the gas taken in by the gas intake 5 can bypass to the gas outlet 6 when the catalytic-adsorbent 33 is being replaced.

Such bypass is possible by shutting down the first valve 29 to block the gas from flowing from the gas intake 5 to the induction tube 3, and at the same time the second valve 30 is opened to allow the gas taken in by the gas intake 5 and bypassed to the gas outlet 6 through the connection tube 31. As illustrated in the drawing, the connection tube 31 is made up of a flexible-type tube material similar to passages 12 and 15, so that the connection tube 31 has flexibility to adjust to the connecting distance between the gas intake 5 and gas outlet 6.

Following are detailed explanations on operation of the adsorbent gas scrubber 1 in accordance with foregoing descriptions. First, the gas that flows into the induction tube 3 from the gas intake 5 is supplied to the catalytic-adsorbent 33 located at the bottom of the adsorbent case 4 via the passage 12. While the gas passes around and about the catalytic-adsorbent 33 particles, the harmful material contained in the gas is chemically and physically adsorbed in the catalytic-adsorbent 33 as a result of the chemical and physical reactions described above, and then the clean gas is exhausted from case 20 through the gas passage holes 26 formed in the cap 21 that covers the top of the catalytic-adsorbent case 20. As the gas continuously passes through the catalytic-adsorbent 33 and the harmful materials contained in the gas are adsorbed, the passage space of the catalytic-adsorbent 33 becomes clogged due to the adsorption of the harmful materials. As a result, the quantity and flow rate of the harmful gas is reduced. When the passage space of the catalytic-adsorbent 33 is clogged by the adsorption of the harmful materials, the pressure of the gas exhaust through the gas outlet 6 measured by the second pressure gauge P2 placed in the gas outlet 6 declines.

The pressure of the gas measured by the second pressure gauge P2 is then compared with the pressure of the induction gas measured by the first pressure gauge P1 located in the gas intake 5 to obtain the difference in pressure values. If the obtained value of the pressure difference is larger than a threshold pressure value, then the piston material 11 of the gas passage means 7 begins to operate. The operation of the piston material 11 is programmed in the main system of the adsorbent gas scrubber in accordance with the present invention in order to operate the gas passage means 7 located on the top of the gas passage 15.

When the pressure difference between the pressure value measured by the second pressure gauge P2 and the pressure value measured by the first pressure gauge P1 is larger than the threshold pressure value, the corresponding valve material 13 of the gas passage units 7 moves as result of operation of the piston material to the position shown in FIG. 4 as having a series of short dashes. Then the gas is supplied to the catalytic-adsorbent 33 layered at the second from the bottom of the adsorbent case 4 and then the same operation as the catalytic-adsorbent 33 located on the bottom occurs.

The above mentioned operation is continuously repeated until the catalytic-adsorbent 33 located at the top of the adsorbent case 4 is fully used up and the gas flow rate continues to decline. If the adsorption efficiency of the catalytic-adsorbent 33 located in the top-most case 20d declines, i.e., when the pressure difference between the gas pressure measured by the second pressure gauge P2 and the gas pressure measured by the first pressure gauge P1 is larger than the threshold pressure value, all of the catalytic-adsorbent 33 located in the adsorbent case 4 must be replaced with new catalytic-adsorbent 33.

To replace the catalytic-adsorbent 33, all the materials, such as the gas outlet 6, the gas passage units 7, the gas passage mechanism 15 and the connection tube 31, connected to the adsorbent case 4 with the connection means such as the clamp are detached from the adsorbent case 4, and then the adsorbent case is taken out from the cabinet 2.

The circular plate 17 that covers the top of the adsorbent case 4 is detached from the adsorbent case 4 by removing the bolt 32 to open the top of the adsorbent case 4. The catalytic-adsorbent case 20 is separated from the adsorbent case 4 through the opening at the top of the adsorbent case 4 in top-to-bottom order. Thereafter, the catalytic-adsorbent case 20 filled with new or replenished catalytic-adsorbent 33 is placed back into the adsorbent case 4 in reverse order to the order in which they are removed. More specifically, the adsorbent case 4 having the catalytic-adsorbent case 20 with new catalytic-adsorbent 33 is installed back into the cabinet 2 in reverse order of the separation procedure.

As mentioned above, according to the present invention which relates to the adsorbent gas scrubber having a structure whereby the adsorbing case including the catalytic-adsorbent can be easily and quickly exchanged from the adsorbent case, the processing efficiency of the harmful gas generated during semiconductor manufacturing may be increased in proportion to the reduction of the idle time of the system.

A various modifications of the above described embodiments of the invention will be apparent to those skilled in the art and it is to be understood that such modifications are within the spirit and scope of the invention, as defined in the appended claims.

What is claimed is:

1. A gas scrubber, comprising:
   an induction tube coupled to a gas intake and a first pressure gauge for measuring pressure within the gas intake;
   an adsorbent case coupled to a gas outlet and a second pressure gauge for measuring pressure within the gas outlet, wherein the adsorbent case contains a plurality of catalytic-adsorbent members; and
   a plurality of gas passage tubes extending from said induction tube to respective said catalytic-adsorbent members, wherein said gas scrubber is configured to regulate gas flow within the gas passage tubes based on a pressure differential measured between said first pressure gauge and said second pressure gauge.

2. The gas scrubber according to claim 1, wherein said gas flow within the gas passage tubes is regulated based on the pressure differential measured between said first pressure gauge and said second pressure gauge.

3. The gas scrubber according to claim 1, wherein said induction tube and said adsorbent case are at least partially contained within a cabinet.

4. The gas scrubber according to claim 1, wherein each of said plurality of catalytic-adsorbent members comprises a container holding a plurality of catalytic adsorbent particles.

5. The gas scrubber according to claim 4, wherein said container comprises a lid having a plurality of openings for permitting gas flow from the container into the adsorbent case.

6. The gas scrubber according to claim 1, wherein each of the plurality of gas passage tubes comprises a piston and a valve for providing a regulated gas flow opening between the induction tube and respective said catalytic-adsorbent members.

7. The gas scrubber according to claim 1, adapted to separately regulate gas flow within each of said plurality of gas passage tubes.

8. The gas scrubber according to claim 1, adapted to either allow or block gas flow within a subset of the plurality of gas passage tubes.

9. An adsorbent gas scrubber comprising:
   an induction tube coupled to a gas intake attached with a first pressure gauge for measuring pressure within the gas intake;
   an adsorbent case placed in proximity to said induction tube, said adsorbent case comprising a plurality of catalytic-adsorbent members to adsorb a gas flowing from said induction tube to a gas outlet attached with a second pressure gauge for measuring pressure of the adsorbed gas within the gas outlet, and wherein an upper portion of the adsorbent case is absent of said catalytic-adsorbent members;
   a plurality of gas passages extending between the induction tube and the adsorbent case for delivering the gas from the induction tube to the plurality of the catalytic-adsorbent members; and
   a gas passage means for controlling flow of the gas delivered from the induction tube by allowing or blocking the gas from flowing into each of said catalytic-adsorbent members based on a pressure difference between said first pressure gauge and said second pressure gauge.

10. The adsorbent gas scrubber according to claim 9, further comprising:
    a pipe connected between said gas inlet and said gas outlet;
    a first open/shut valve being located in the gas inlet; and
    a second open/shut valve placed in said pipe.

11. The adsorbent gas scrubber according to claim 9, wherein said gas passage means comprises a plurality of pistons and valves contained within a mechanism that is fixed to the outside of said the adsorbent case and which operate when the pressure difference between the first and second pressure gauge is larger than a threshold value.

12. The adsorbent gas scrubber according to claim 9, wherein a first end of each of said plurality of gas passages is connected to said induction tube, wherein a middle portion of each of said plurality of gas passages is connected to said adsorbent case, and wherein a second end of each of said plurality of gas passages comprises one of said plurality of valves.

13. The adsorbent gas scrubber according to claim 11, wherein each of said plurality of catalytic-adsorbent members is fixed onto an inner surface of said adsorbent case by a supporter, and wherein each of said plurality of catalytic-adsorbent members comprises a plurality of catalytic-adsorbent particles confined within a container having an opening in gaseous communication with the middle portion of a respective gas passage coupled thereto.

14. The adsorbent gas scrubber according to claim 13, wherein said container is enclosed with a perforated, substantially circular cap.

15. The adsorbent gas scrubber according to claim 9, wherein said catalytic-adsorbent members comprise carbon particles.

16. The adsorbent gas scrubber according to claim 9, wherein said catalytic-adsorbent members comprise carbon particles coated with oxygen metals.

17. The adsorbent gas scrubber according to claim 9, wherein said catalytic-adsorbent members comprise $Al_2O_3$ particles.

18. The adsorbent gas scrubber according to claim 9, wherein said catalytic-adsorbent members comprise $Al_2O_3$ particles coating with oxygen metals.

* * * * *